(12) United States Patent
Yamazaki et al.

(10) Patent No.: US 8,570,479 B2
(45) Date of Patent: Oct. 29, 2013

(54) LIQUID CRYSTAL ELECTROOPTICAL DEVICE

(75) Inventors: Shunpei Yamazaki, Kanagawa (JP); Jun Koyama, Kanagawa-ken (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 1211 days.

(21) Appl. No.: 11/624,055

(22) Filed: Jan. 17, 2007

(65) Prior Publication Data

US 2007/0115416 A1 May 24, 2007

Related U.S. Application Data

(62) Division of application No. 11/072,455, filed on Mar. 7, 2005, which is a division of application No. 10/016,923, filed on Dec. 13, 2001, now Pat. No. 6,900,873, which is a division of application No. 09/198,073, filed on Nov. 23, 1998, now Pat. No. 6,362,866.

(30) Foreign Application Priority Data

Nov. 28, 1997 (JP) .................................... 9-344402

(51) Int. Cl.
*G02F 1/1345* (2006.01)
(52) U.S. Cl.
USPC .......................................... 349/151; 349/152
(58) Field of Classification Search
USPC .......................................... 349/149–151, 152
See application file for complete search history.

(56) References Cited

U.S. PATENT DOCUMENTS

| 4,127,321 | A | * | 11/1978 | Koyama et al. | 349/152 |
|---|---|---|---|---|---|
| 4,295,711 | A | | 10/1981 | Tanaka et al. | |
| 4,586,789 | A | * | 5/1986 | Kishimoto et al. | 349/152 |
| 4,906,071 | A | | 3/1990 | Takahara et al. | |
| 4,985,663 | A | * | 1/1991 | Nakatani | 315/169.3 |
| 5,089,750 | A | * | 2/1992 | Hatada et al. | 315/169.3 |
| 5,148,301 | A | | 9/1992 | Sawatsubashi | |
| 5,179,460 | A | | 1/1993 | Hinata | |
| 5,233,211 | A | * | 8/1993 | Hayashi et al. | 257/347 |
| 5,261,156 | A | | 11/1993 | Mase | |
| 5,270,848 | A | * | 12/1993 | Takabayashi et al. | 349/152 |
| 5,359,345 | A | * | 10/1994 | Hunter | 345/102 |
| 5,371,398 | A | | 12/1994 | Nishihara | |
| 5,416,341 | A | * | 5/1995 | Hayama | 257/59 |
| 5,528,403 | A | | 6/1996 | Kawaguchi | |

(Continued)

FOREIGN PATENT DOCUMENTS

JP 60-21083 2/1985
JP 01-152426 A 6/1989

(Continued)

*Primary Examiner* — James Dudek
(74) *Attorney, Agent, or Firm* — Fish & Richardson P.C.

(57) ABSTRACT

To provide means for resolving a problem in which in steps of connecting a panel array substrate and a stick substrate, connection failure is enhanced and reliability is deteriorated by a positional shift caused in connecting operation and a positional shift caused by shrinkage of the substrate, a shape of a total of a stick substrate 103 is constituted by a rectangular shape ($Lx_1 \times Ly_1$) and contiguous electrode pads are arranged to shift by Ts in Y-direction by which lead wirings of the panel array substrate and lead wirings of the stick substrate can be connected with high accuracy and an electrooptical device having high yield and excellent display characteristic is provided.

48 Claims, 4 Drawing Sheets

(56) References Cited

U.S. PATENT DOCUMENTS

| | | | |
|---|---|---|---|
| 5,606,440 A * | 2/1997 | Kawaguchi et al. | 349/188 |
| 5,648,277 A | 7/1997 | Zhang | |
| 5,654,811 A | 8/1997 | Spitzer | |
| 5,680,192 A | 10/1997 | Burrell | |
| 5,712,493 A | 1/1998 | Mori | |
| 5,742,074 A * | 4/1998 | Takizawa et al. | 257/59 |
| 5,757,456 A | 5/1998 | Yamazaki | |
| 5,766,977 A | 6/1998 | Yamazaki | |
| 5,781,164 A | 7/1998 | Jacobsen | |
| 5,790,220 A | 8/1998 | Sakamoto et al. | |
| 5,822,030 A | 10/1998 | Uchiyama | |
| 5,825,439 A | 10/1998 | Noriyama | |
| 5,834,327 A | 11/1998 | Yamazaki | |
| 5,835,177 A | 11/1998 | Dohjo | |
| 5,889,291 A | 3/1999 | Koyama | |
| 6,118,502 A | 9/2000 | Yamazaki et al. | |
| 6,198,133 B1 | 3/2001 | Yamazaki | |
| 6,404,476 B1 | 6/2002 | Mase | |
| 7,050,138 B1 | 5/2006 | Yamazaki et al. | |
| 7,446,843 B2 | 11/2008 | Yamazaki et al. | |
| 2003/0071953 A1 | 4/2003 | Yamazaki et al. | |
| 2005/0070038 A1 | 3/2005 | Yamazaki et al. | |
| 2009/0185130 A1 | 7/2009 | Yamazaki et al. | |

FOREIGN PATENT DOCUMENTS

| | | |
|---|---|---|
| JP | 01-281431 | 11/1989 |
| JP | 05-014911 A | 1/1993 |
| JP | 05-264987 A | 10/1993 |
| JP | 05-265022 | 10/1993 |
| JP | 07-014880 | 1/1995 |
| JP | 07-135318 | 5/1995 |
| JP | 07-044369 | 11/1995 |
| JP | 08-015715 A | 1/1996 |
| JP | 08-078329 | 3/1996 |
| JP | 08-250745 A | 9/1996 |
| JP | 08-254686 A | 10/1996 |
| JP | 10-135468 | 5/1998 |
| JP | 10-247735 | 9/1998 |

\* cited by examiner

LIQUID CRYSTAL ELECTROOPTICAL DEVICE

CROSS-REFERENCE TO RELATED APPLICATIONS

This application is a divisional application of and claims priority to U.S. application Ser. No. 09/198,073 filed Nov. 23, 1998.

BACKGROUND OF THE INVENTION

1. Field of the Invention

The present invention relates to a liquid crystal electrooptical device using a display member of liquid crystal or the like, particularly to a constitution thereof.

2. Description of Related Art

The most general conventional display device is CRT (Cathode Ray Tube). However, in the case of CRT volume, weight and power consumption of the device are large and particularly, CRT is not suitable for a display device having a large area. Hence, in recent years, a liquid crystal electrooptical device capable of realizing light weight formation and low power consumption formation more easily than CRT attracts attention.

According to a liquid crystal electrooptical device, a difference in the dielectric constant of a liquid crystal substance between a direction in parallel with the molecular axis and a direction orthogonal thereto is utilized and polarization of light, a light transmittance amount and a scatter amount of light are controlled by which ON/OFF, that is, brightness and darkness are displayed. As material for liquid crystal, TN (Twist Nematic) liquid crystal, STN (Super Twist Nematic) liquid crystal and ferroelectric liquid crystal are generally used.

Particularly, among liquid crystal electrooptical devices, a liquid crystal electrooptical device of an active matrix type using a semiconductor device having TFT (Thin Film Transistor) on an insulating substrate of glass or the like, for example, thin film transistors for driving pixels has been developed actively.

A panel portion of a liquid crystal electrooptical device of an active matrix type is provided with a constitution in which signal lines and scanning lines are combined in a matrix on a glass substrate and TFTs are arranged at vicinities of intersecting portions. According to the constitution, a source electrode of TFT is connected to a signal line and a gate electrode is connected to a scanning line. Further, a drain electrode is connected to a pixel electrode arranged in correspondence with maintained capacitance and the liquid crystal in a pixel region. Liquid crystal is driven by being interposed between an opposed electrode and a pixel electrode. The opposed electrode is formed on an opposed substrate.

Further, a drive circuit portion for driving the signal lines and the scanning lines in the panel portion is formed by a semiconductor integrated circuit of a single crystal and is connected to the active matrix by Tape Automatic Bonding (TAB) process or Chip On Glass (COG) process.

However, a number of electrode wirings for constituting a display screen reaches as far as several hundreds. Further, a conventional peripheral drive circuit is constituted by an IC (Integrated Circuit) package or a semiconductor chip and accordingly, in order to connect a terminal thereof to electrode wirings on the substrate, the wirings must be led around and an area of a peripheral drive circuit portion becomes large in comparison with a display screen. Particularly, in the case of a display device having a large area, a number of the electrode wirings is further increased and accordingly, there poses a problem in which a number of ICs is increased resulting in an increase in cost.

Further, a method of arranging a drive portion on a substrate the same as that of a panel portion has been conceived as a method of resolving the above-described problem. The drive portion in this case is formed similar to the panel portion by using thin film transistors. However, in the case where the panel portion and the drive portion are integrally formed on the same substrate, when heat or force from outside is effected, warp or the like is caused in the entire substrate and adverse influence is effected on a peripheral drive circuit installed on the same substrate by a substrate interval control member (spacer or the like). As a result, the peripheral drive circuit is not normally operated and deterioration in reliability and durability of a liquid crystal electrooptical device is caused. Further, the panel portion and the drive portion are simultaneously formed and accordingly, the yield is deteriorated particularly in the case of a display device having a large area.

Further, as other method of resolving the above-described problem, there has been conceived a method in which a drive portion is formed on other support substrate and is adhered onto a panel array substrate (substrate formed with panel portion) or a method in which after adhering a drive portion formed on other support substrate on a panel array substrate, the support substrate is removed. Further, according to the constitution provided by the method, further small size formation and light weight formation can be achieved and promotion in reliability of a display device can be achieved. Further, according to the method, a panel array substrate and a stick substrate (substrate formed with drive portion) are separately formed and therefore, excellent products and failed products can be selected by testing electric properties before the adhering operation and an excellent product of the panel array substrate and an excellent product of the stick substrate can be adhered to each other. Accordingly, in the case of a display device having a large area, the yield and the reliability of a total of an electrooptical device can significantly be promoted.

In using the above-described method, that is, the method of forming a drive portion on other support substrate and adhering it on a panel array substrate, reliability and fabrication yield of a total of an electrooptical device is controlled mainly by the following factors.

(1) Steps of fabricating a panel array substrate and fabricating a panel.

(2) Steps of fabricating a stick substrate (support substrate formed with a drive portion).

(3) Steps of connecting the stick substrate and the panel array substrate.

First, in the steps of fabricating the panel array substrate and the panel of (1), amorphous silicon (a-Si) is suitably used as a semiconductor material of pixel TFTs at the panel portion. That is, amorphous silicon semiconductor which is most generally used is suitably used as the semiconductor material of the panel portion since the fabrication temperature is low, the fabrication can be carried out comparatively easily by a gas phase process and the mass production performance is excellent.

Next, according to the steps of fabricating the stick substrate of (2), silicon semiconductor having crystalline performance (polysilicon) is suitably used as a semiconductor material of TFTs of the drive portion. That is, the silicon semiconductor having the crystalline performance in which physical properties of conductivity and the like are more excellent than those of amorphous silicon and high speed driving is feasible is suitably used as the semiconductor material of TFTs of the drive portion. Further, as the silicon semiconductor having the crystalline performance, there have been known polycrystal silicon, microcrystal silicon, amorphous silicon including a crystal component, semi-amorphous silicon having a state of an intermediary between the crystalline performance and the amorphous performance and so on.

As a method of providing the silicon semiconductor in a shape of a thin film having the crystalline performance, there has been known a method in which an amorphous semiconductor film is formed and thermal energy is applied for a long period of time (thermal annealing) to thereby provide the crystalline performance. However, it becomes necessary to carry out a processing for a long period of time at high temperature of 600° C. or higher as heating temperature and accordingly, there poses a problem in which the substrate is irreversibly shrunk.

When an electrooptical device is fabricated by adhering the panel array substrate formed by the amorphous silicon semiconductor as a semiconductor material of TFTs in this way, with the stick substrate formed by the silicon semiconductor having the crystalline performance as a semiconductor material of TFTs, the following problem is caused.

The panel array substrate uses the amorphous silicon semiconductor and therefore, almost no shrinkage is caused in the substrate (shrinkage of substrate), however, the stick substrate has been subjected to a thermal treatment at high temperatures to provide the silicon semiconductor having the crystalline performance and therefore, shrinkage is caused. Further, a substrate capable of withstanding the thermal treatment at high temperatures is used for the stick substrate and accordingly, the stick substrate per se is different from the panel array substrate. That is, a difference in a shrinkage width of substrate is caused between the panel array substrate and the stick substrate.

Particularly, in the case of a display device having a large area, the shape of the stick substrate is constituted by a rectangular shape having one long side (lateral length (X-direction)×vertical length (Y-direction)) and therefore, an alignment before the heating process is delicately shifted and effects a significant influence in the long side direction.

Accordingly, in the steps of connecting the panel array substrate and the stick substrate of (3), there poses a problem in which connection failure is enhanced and reliability is deteriorated by positional shift in wiring patterns caused by the difference in the shrinkage widths of the panel array substrate and the stick substrate. FIG. 8 shows a conventional example in which a positional shift in wiring patterns is caused by a shrinkage width D in X-direction of a stick substrate 803 at an end portion of the stick substrate in X-direction. Further, the positional shift in the wiring patterns is increased toward the end portion in the long side direction (X-direction) and an area of overlapping an electrode pad 808 and an electrode pad 806 is decreased.

Further, in the steps of connecting the panel array substrate and the stick substrate of (3), the wiring patterns may slightly be shifted from each other in the connecting operation and there also poses a problem in which connection failure is enhanced and reliability is deteriorated by the positional shift in the wiring patterns in this case.

SUMMARY OF THE INVENTION

The present invention provides means for resolving the above-described problems. More specifically, the present invention particularly provides an electrooptical device fabricated by a fabrication method suitable for a device having a display screen of a large area, that is, a method in which a drive portion is formed on other support substrate and is adhered onto a panel array substrate.

In addition thereto, the present invention particularly discloses means for connecting lead wirings of a panel array substrate with lead wirings of a stick substrate with high accuracy and it is an object of the present invention to provide an electrooptical device having high yield and excellent display characteristic.

According to an aspect of the present invention disclosed in the specification, there is provided a liquid crystal electrooptical device including:

a first substrate arranged with switching elements using thin film transistors and pixel electrodes connected to the switching elements in a matrix shape; and a second substrate having opposed electrodes;

wherein liquid crystals are interposed between the first substrate and the second substrate, further including:

at least one sheet or more of third substrates each arranged with a drive circuit for driving the liquid crystals and a plurality of lead wirings connected to the drive circuit;

wherein electrode pads are installed at end portions of the plurality of lead wirings on the third substrate;

wherein contiguous ones of the electrode pads are arranged to shift in a direction of extending the lead wirings.

Further, according to another aspect of the present invention, there is provided a liquid crystal electrooptical device including:

a first substrate arranged with switching elements using thin film transistors and pixel electrodes connected to the switching elements in a matrix shape; and a second substrate having opposed electrodes;

wherein liquid crystals are interposed between the first substrate and the second substrate, further including:

at least one sheet or more of third substrates each arranged with a drive circuit for driving the liquid crystals and a plurality of lead wirings connected to the drive circuit;

wherein electrode pads are arranged at end portions of the plurality of lead wirings on the third substrate;

wherein a shape of the electrode pad is a rectangular shape;

wherein one set of opposed two sides of the rectangular shape is prescribed by a shrinkage width of the third substrate and other set of opposed two sides is prescribed by a wiring pattern formed on the first substrate.

According to another aspect of the present invention, there is provided the liquid crystal electrooptical device in the above-described constitution:

wherein the shrinkage width of the third substrate is larger than a shrinkage width of the first substrate.

Further, according to another aspect of the present invention, there is provided the liquid crystal electrooptical device in the above-described constitution:

wherein at least a portion of the wiring pattern is constituted by scanning wirings.

Further, according to another aspect of the present invention, there is provided the liquid crystal electrooptical device in the above-described constitution:

wherein at least a portion of the wiring pattern is constituted by signal wirings.

According to another aspect of the present invention, there is provided the liquid crystal electrooptical device in the above-described constitution:

wherein the third substrate is processed with a heat treatment at a temperature higher than a temperature of a heat treatment of the first substrate.

According to another aspect of the present invention, there is provided the liquid crystal electrooptical device in the above-described constitution:

wherein the third substrate is substantially flush with the second substrate.

According to another aspect of the present invention, there is provided the liquid crystal electrooptical device in the above-described constitution wherein an activation layer of the thin film transistor used as the switching element of the first substrate comprises amorphous silicon; and wherein an activation layer of a thin film transistor used as a switching element of the third substrate comprises silicon having a crystalline performance.

According to another aspect of the present invention, there is provided the liquid crystal electrooptical device in the above-described constitution wherein an activation layer of the thin film transistor used as the switching element of the first substrate comprises silicon having a crystalline performance; and wherein an activation layer of a thin film transistor used as a switching element of the third substrate comprises silicon having a crystalline performance.

According to another aspect of the present invention, there is provided the liquid crystal electrooptical device in the above-described constitution wherein the first substrate and the third substrate include positioning means for adjusting to position portions of the electrode pads of the third substrate.

According to another aspect of the present invention, there is provided the liquid crystal electrooptical device in the above-described constitution wherein the first substrate is provided with a shrinkage rate different from a shrinkage rate of the third substrate.

DETAILED DESCRIPTION OF THE PREFERRED EMBODIMENTS

Figure 1:
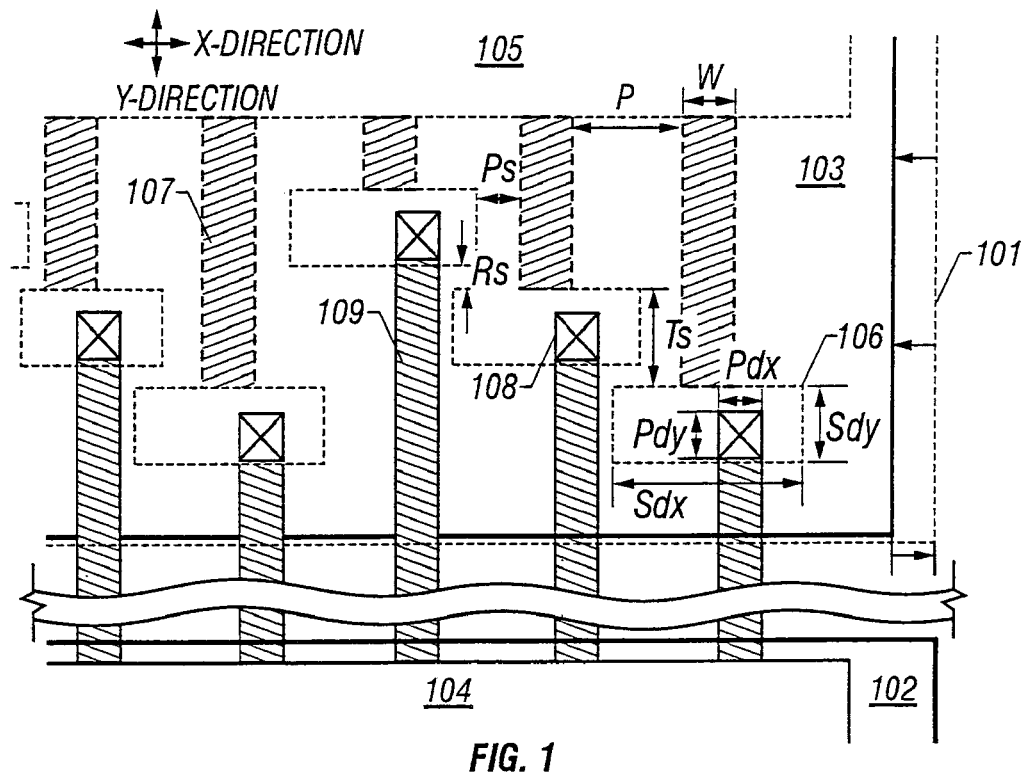
FIG. 1 is a layout diagram showing an embodiment according to the present invention.
Figure 2:
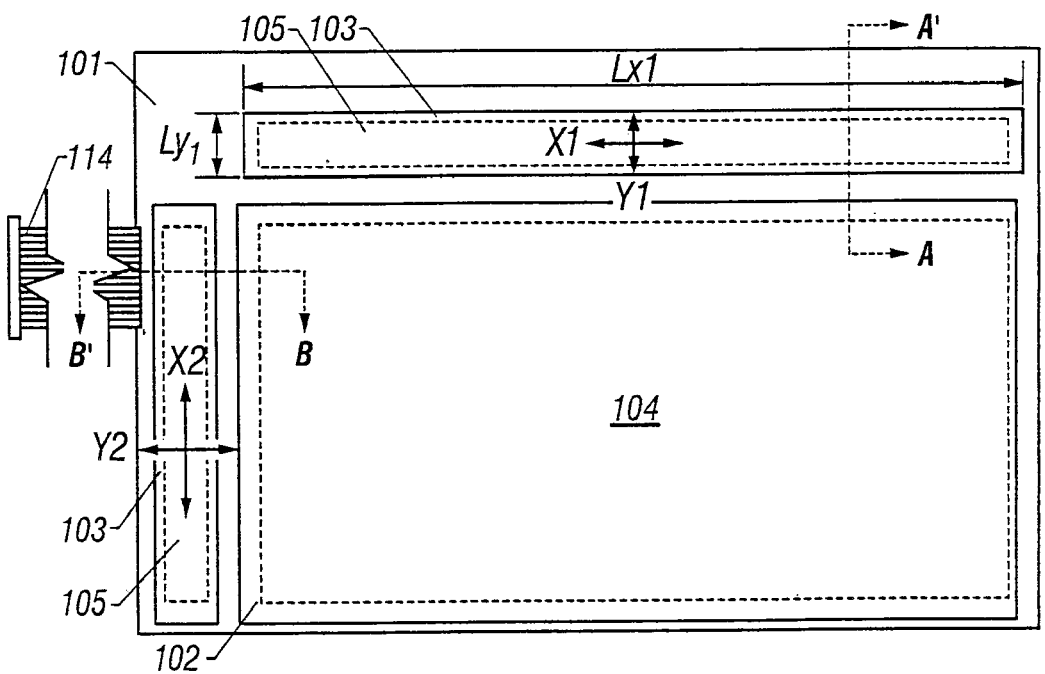
FIG. 2 is an outline view of a total showing the embodiment according to the present invention.
Figure 3A:
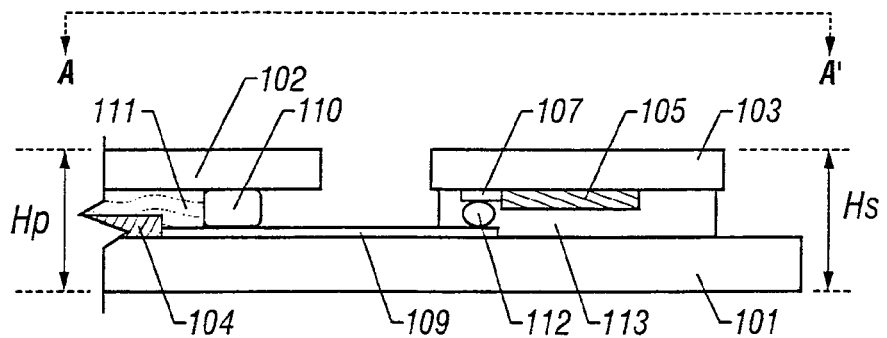
FIGS. 3(a) and 3(b) are sectional views of FIG. 2.
Figure 3B:
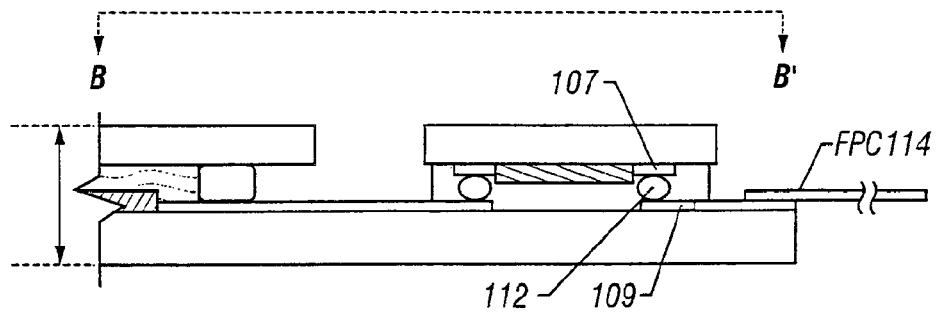
Figure 6A:
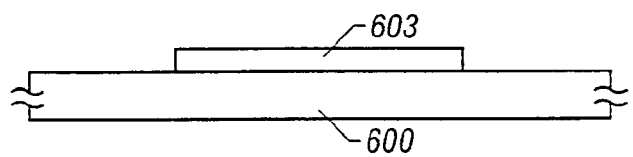
FIGS. 6(A), 6(B), 6(C) and 6(D) are views showing fabrication steps of TFT of a stick substrate.
Figure 6B:
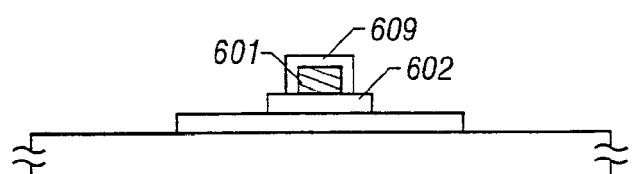
Figure 6C:
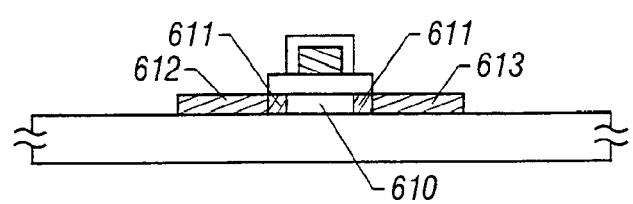
Figure 6D:
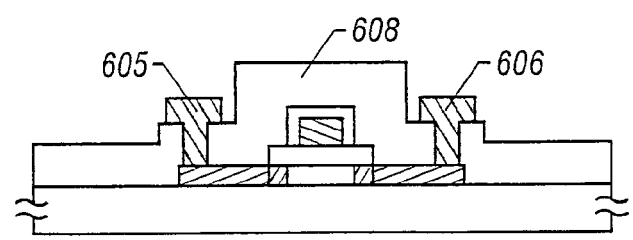
Figure 4A:
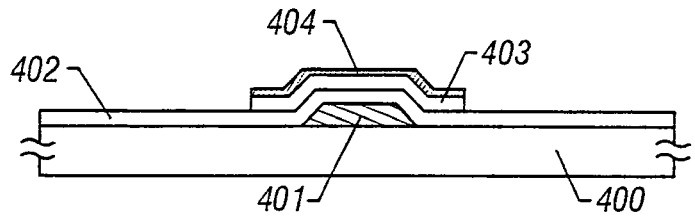
FIGS. 4(A), 4(B), 4(C) and 4(D) are views showing fabrication steps of TFT of a panel array substrate.
Figure 4B:
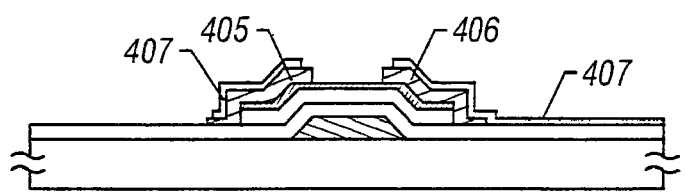
Figure 4C:
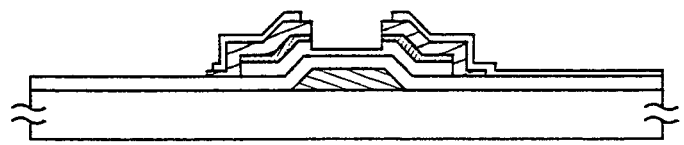
Figure 4D:
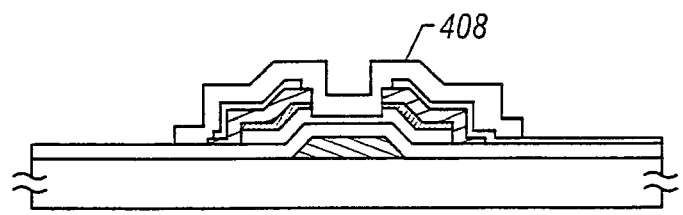

A liquid crystal electrooptical device according to the present invention is featured in using an outline constitution of a device illustrated by FIG. 2 and FIGS. 3(a) and 3(b) and having a layout illustrated by FIG. 1. Although in FIG. 1, a constitution in which every three of electrode pads are shifted in Y-direction is exemplified, particularly, a number of electrode pads to be shifted is not naturally limited.

In this embodiment, a shrinkage width of a substrate is the most important factor. The shrinkage width of the substrate is varied based on heat treatment temperature and treatment time of the substrate and a shrinkage rate of the substrate per se. The shrinkage rate (shrinkage distance per unit distance) of the substrate is mainly controlled by a kind of the substrate and its properties (thermal expansion coefficient, strain point and so on), size, thickness and so on.

Accordingly, dimensions (scale) of a layout shown below is naturally designed pertinently in sufficient consideration of the factors.

As shown by FIG. 2, the shape of a total of a stick substrate 103 is a rectangular shape ($Lx_1 \times Ly_1$). Further, a position of arranging the stick substrate 103 is allowed to dispose at outside of a pixel matrix forming region 104. The shape and the arrangement are pertinently designed mainly by the size of the pixel matrix forming region 104.

In the specification, a direction of a long side of an outer peripheral edge of the stick substrate 103 is set to X-direction and a direction of a short side thereof is set to Y-direction. Specifically, a direction directed from a drive circuit portion 105 of the stick substrate to a side of the pixel matrix forming region 104, that is, a direction of extending a lead wiring 107 installed to the stick substrate is Y-direction.

As shown by FIG. 1, the lead wirings 107 (line width W) on the stick substrate side are installed in parallel from the drive circuit portion 105 of the stick substrate to the side of the pixel matrix forming region 104, contiguous ones of the lead wirings maintain a constant interval (line interval P) and electrode pads 106 (stick side electrode pads) are installed at end portions of these wirings. The line interval P and the line width W may be pertinently designed in accordance with a wiring pattern or the like on the panel side. A panel array substrate 101 is also installed with electrode pads 108 (panel side electrode pads) at end portions of lead wirings 109 on the panel side to electrically connect to the stick side electrode pads 106.

The electrode pads are not directly connected to each other but connected via a conductive member (bump, anisotropic conductive film, conductive small particles, FPC or the like) and accordingly, it is preferable to enlarge an area of overlapping the electrode pads as large as possible. However, in the case in which the shrinkage of the stick substrate is large, when faces of the electrodes are only enlarged simply, there poses a problem of shortcircuit of contiguous electrode pads, occurrence of parasitic capacitance or the like.

Hence, in the present invention, the shape of electrode pad 106 is constituted by a rectangular shape with a long side (Sdx) in X-direction and a short side (Sdy) in Y-direction. The long side (Sdx) is prescribed by the shrinkage width D of the stick substrate in X-direction and a positional shift in pasting. In this way, a change (shrinkage, shift in adherence or the like) of the stick substrate in the long side direction (X-direction) which has particularly been problematic can be dealt with and the electric connection in respect with the lead wiring 109 on the side of the panel array substrate can further be ensured.

Further, contiguous ones of the electrode pads are arranged to shift by Ts in Y-direction and shortcircuit of the contiguous electrode pads is eliminated. In addition thereto, by arranging to shift the contiguous electrode pads in Y-direction, a pitch per electrode pad in X-direction can be reduced and a very small pixel pitch can be dealt with. A distance (Ts) of the shift in Y-direction may pertinently be designed in accordance with a wiring pattern or the like on the panel side. Further, an interval (Rs) between the contiguous electrode pads in Y-direction and an interval (Ps) between the electrode pad and a contiguous wiring may also be designed pertinently similar to Ts.

Naturally, the panel side electrode pads 108 are arranged to shift by Ts in Y-direction in correspondence with the stick side electrode pads 106.

The shape of the electrode pad 108 (panel side electrode pad) is substantially set to a square shape of (Pdx) in X-direction and (Pdy) in Y-direction. The shape of the pad is not particularly limited so far as it is the shape smaller than the electrode pad 106 (stick side electrode pad). In this way, the shape and the arrangement of the electrode pad 108 are optimized.

By designing in this way, even when the stick substrate is shrunk by the shrinkage width D in the long side direction relative to that before being subjected to thermal treatment at high temperatures, the area of overlapping the electrode pad on the side of the stick substrate and the electrode pad on the side of the panel array substrate can substantially be made uniform over entire face of the substrate. As shown by FIG. 1, when the stick substrate shrinks by the shrinkage width D, the area of overlapping the electrode pads is substantially equal to an area (Pdx×Pdy) of the pad on the side of the panel array substrate. Further, the constitution is also effective in respect of the positional shift in the long side direction when the substrates are pasted together. Accordingly, the lead wirings of the panel array substrate and the lead wirings of the stick substrate can be connected to each other with high accuracy.

Further, as other constitution, there may be provided a constitution reverse to the above-described constitution, that is, the panel side electrode pad may be formed in a rectangular shape and the stick side electrode pad may be formed in a square shape smaller than the panel side electrode pad.

Embodiments an explanation will be given of embodiments according to the present invention as follows, however, the present invention is not naturally limited to the embodiments.

Embodiment 1

The embodiment shows an outline of steps of fabricating a panel, steps of fabricating a stick substrate and steps of connecting the panel array substrate and the stick substrate. An explanation will be given of the embodiment in reference to FIGS. 1, 2, 3(*a*), 3(*b*), 4(A), 4(B), 4(C), 4(D), 5, 6(A), 6(B), 6(C) and 6(D). FIG. 2 is a simplified view of a total of an electrooptical device according to the present invention. Further, FIGS. 3(*a*) and 3(*b*) are a sectional view taken along a line A-A' of FIG. 2 and a sectional view taken along a line B-B' thereof.

(Fabrication Steps of Panel)

In this embodiment, there is constituted a switching element used in a pixel matrix on a panel array substrate 400 by using amorphous silicon semiconductor which is used most generally since the fabrication temperature is low and the element can be fabricated comparatively easily by a gas phase process and is excellent in mass production performance.

As a structure of the switching element, there may be used planar type TFT having the top gate structure which is suitable for large area display since gate material (Al) can easily be thickened. However, the embodiment shows an example of using a thin film transistor of the bottom gate type (representatively, inverse stagger type TFT) in which a number of masks is small and the mass production performance is excellent.

FIGS. 4(A), 4(B), 4(C) and 4(D) show an example of steps of fabricating a thin film transistor of a representative bottom gate type (channel etch type) using amorphous silicon semiconductor.

First, a glass substrate 400 (Corning 7059 in this embodiment) is prepared. The steps of fabricating a panel array substrate is processed at 600° C. or lower and therefore, substrates constituted by almost all of glass material can be used. The glass substrate is not particularly limited so far as it is a substrate suitable for mass production performance.

Next, a gate electrode 401 is formed by forming and patterning a metal film having conductivity on the glass substrate. Thereafter, a gate insulating film 402 and an amorphous silicon film 403 are laminated. Further, a silicon film 404 provided with N type or P type is laminated. Next, the silicon films 403 and 404 are patterned to provide a state shown by FIG. 4(A).

Further, by forming a metal film having conductivity and patterning it, a source electrode 405 and a drain electrode 406 are fabricated and an ITO (Indium Tin Oxide) electrode 407 are formed. The ITO electrode 407 may be constituted to install before forming films of the source and the drain electrodes.

Next, the amorphous silicon film 403 is etched with the source electrode and the drain electrode as masks. Finally, a protective film (passivation film) 408 is formed by which a state shown by FIG. 4(D) can be provided.

Figure 5:
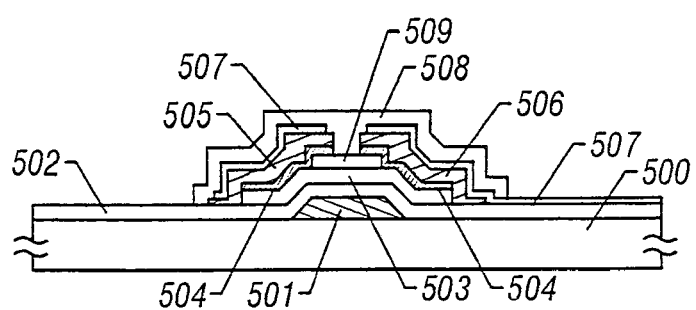
FIG. 5 illustrates an example of the structure of TFT of the panel array substrate.

Although there has been shown a method of fabricating a thin film transistor of a bottom gate type in a channel etch type in this case, a thin film transistor having a structure of a channel stop type as shown by FIG. 5 may be used. Numeral 501 designates a gate electrode, numeral 502 designates a gate insulating film, numeral 503 designates an amorphous silicon film, numeral 504 designates a silicon film provided with N type or P type, numeral 505 designates a source electrode, numeral 506 designates a drain electrode, numeral 507 designates an ITO electrode, numeral 508 designates a protective film and numeral 509 designates an etching stopper (channel stopper).

The panel array substrate 101 is fabricated with such a thin film transistor as a switching element of the pixel matrix.

Next, orientation films are formed on the panel array substrate 101 and an opposed substrate 102 (substrate fabricated with opposed electrode) and the orientation films are heated and cured (baked). Successively, there is carried out a rubbing step for forming fine grooves by rubbing surfaces of the substrates adhered with the orientation films in a constant direction by buff cloth (fiber of rayon, nylon or the like) having the staple length of 2 through 3 mm. Thereafter, spacers of balls of polymer-series, glass-series, silica-series or the like are scattered on either of the panel array substrate and the opposed substrate. The diameter of the spacer ball is 2 μm through 6 μm, preferably, 3 μm through 5 μm and balls of about 4 μm are used in this embodiment. The magnitude of the diameter of the spacer ball is not particularly limited.

Successively, resin for constituting a seal member 110 installed at an outer frame of the substrate is coated on either of the panel array substrate 101 and the opposed substrate 102.

After installing the seal member, the opposed substrate 102 and the panel array substrate 101 are pasted together. In this way, a liquid crystal material 111 is injected from a liquid crystal injection port of the panel formed by pasting together the panel array substrate 101 and the opposed substrate 102 and thereafter, the liquid crystal injection port is sealed by an epoxy-series resin. In this way, the panel is fabricated.

(Fabrication of Stick Substrate)

FIGS. 6(A), 6(B), 6(C) and 6(D) show fabrication steps of a thin film transistor of a representative top gate type using a silicon semiconductor having crystalline performance (polysilicon).

First, as a substrate, a substrate 600 having high heat resistance (quartz substrate in this embodiment) is prepared and although not illustrated, an insulating silicon film having a thickness of 300 nm is formed on the substrate as a matrix film. The insulating silicon film is any of a silicon oxide film (SiOx), a silicon nitride film (SixNy) and a silicon oxynitride film (SiOxNy) or a laminated film of these.

Further, a glass substrate (material representatively referred to as crystallized glass, glass ceramics or the like) can also be utilized when the strain point is equal to or higher than 750° C. In that case, when a matrix film is fabricated by a low pressure thermal CVD process and the entire face of the substrate is surrounded by an insulating silicon film, content substances can effectively be prevented from flowing out from the glass substrate. Further, there may be adopted means for covering the entire face of the substrate by an amorphous silicon film and completely modifying it into a thermally oxidized film.

Further, by a publicly-known method, a land-like semiconductor region (silicon island) comprising a silicon film having crystalline performance is formed. (FIG. 6(A)) Although the thickness of a silicon film 603 having crystalline performance significantly controls properties of a necessary semiconductor circuit, the thickness may be 20 through 100 nm, preferably, 15 through 45 nm. In this embodiment, the thickness is set to 45 nm. In this case, the substrate is shrunk by about 100 through 150 ppm by the step of providing the silicon film having crystalline performance. The shrinkage rate differs in accordance with conditions of the step.

Although the silicon film having crystalline performance may be formed by using any publicly-known means, the embodiment uses a technology described in Japanese Unexamined Patent Publication No. JP-A-8-78329 capable of lowering a crystallizing temperature and an annealing time period when nickel or the like is added as a catalyst element, since it is preferable to restrain the shrinkage of the substrate as less as possible and restrain the positional shift of the wiring pattern at minimum.

Further, in this embodiment, after providing the silicon film having the crystalline performance by the technology described in the publication, the catalyst element utilized in crystallization is reduced by gettering means using phosphor (heating treatment at 500 through 700° C.) (Japanese Patent Application No. 9-65406). Otherwise, the catalyst element may be reduced by carrying out heating treatment in an atmosphere including a halogen element (700° C. through 1000° C.) (Japanese Unexamined Patent Publication No. JP-A-10-135468).

Thereafter, after forming a gate insulating layer by a plasma CVD process or a thermal CVD process, a silicon oxide film is formed by carrying out a thermally oxidizing step. Further, a film of aluminum or a material whose major component is aluminum (in this embodiment, an aluminum film including 2 wt % of scandium) is formed and patterned to form a gate electrode 601 and wirings. The gate wiring may be made of a metal of silicon, tungsten, titanium or the like or silicides of these. By what material the gate electrode is constituted may be determined by properties of a necessary semiconductor circuit, a heat resistant temperature of the substrate or the like.

Next, a porous anodized film and a poreless anodized film 609 are formed by a technology described in Japanese Unexamined Patent Publication No. JP-A-7-135318. Further, the gate insulating layer is etched with the anodized films and the gate electrode 601 as masks and a gate insulating film 602 is formed. (FIG. 6(B))

Thereafter, an N type or a P type impurity is introduced into the silicon island self-aligningly by means of an ion doping process or the like and a channel region 610, low concentration impurity regions 611, a source region 612 and a drain region 613 are formed. (FIG. 6(C))

Further, an interlayer insulating film 608 is piled up by publicly-known means. Further, a source electrode 605 and a drain electrode 606 are formed by perforating contact holes in the interlayer insulating film 608 and forming wirings made of an aluminum alloy. (FIG. 6(D))

Further, there may be constructed a constitution in which a silicon nitride film or the like having a thickness of 10 through 50 nm is piled up thereon as a protective film (passivation film) by a plasma CVD process and wirings are formed by perforating contact holes communicating with wirings of output terminals.

In this way, a peripheral drive circuit is fabricated on the quartz substrate. It is preferable for promoting mass production performance to fabricate a plurality of peripheral drive circuits on one sheet of a substrate in one operation.

Although according to the embodiment, the arrangement of the lead wirings 107 from the drive circuit portion 105 and the electrode pads 106 is constituted by a layout shown by FIG. 1, it is not particularly limited.

Although according to the embodiment, the top gate structure is used for the switching element of the drive circuit and an example of the case in which the planar type TFT is fabricated as an example of the structure is shown, a bottom gate type TFT, (representatively, inverse stagger type TFT) may be used.

Thereafter, silver paste having the diameter of about 4 μm is mechanically formed on the electrode pad 106. The stick substrate is provided by dividing a circuit obtained in this way into pertinent sizes.

(Steps of Connecting Panel Array Substrate and Stick Substrate)

The panel array substrate 101 and the stick substrate 103 which have been fabricated by the above-described steps are adhered to each other by applying pressure. An explanation will be given in reference to FIGS. 3(A) and 3(B) which are sectional views of the device connecting the panel array substrate 101 and the stick substrate 103. Although in this embodiment, the both substrates are provided with a thickness of 1 mm, the thickness is not particularly limited.

In the above-described pressing operation, it is preferable to construct a constitution in which positioning markers are formed such that positioning of the electrode pads 106 on the stick substrate side and the electrode pads 108 on the panel array substrate side is facilitated. In this embodiment, the stick substrate and the panel array substrate can use substrates having light transmitting performance and therefore, the positioning is facilitated. Further, it is preferable to suitably design the arrangement and the shape of the marker of the stick substrate in consideration of particularly a shift of the stick substrate in the long side direction (shift by shrinkage of substrate, shift in pasting operation or the like) similar to the electrode pad.

In this way, the electrode pad 108 on the panel array substrate side and the electrode pad 106 on the stick substrate side are electrically connected to each other by a conductive member 112 (conductive small particles or the like).

Next, an adhesive agent 113 mixed with photo-curing organic resin is injected to a gap between the stick substrate 103 and the panel array substrate 101. Further, the adhesive agent may be coated beforehand on the surface of either of the stick substrate 103 and the panel array substrate 101 before pressing to contact them.

In this case, it is preferable to make an interval Hp between the opposed substrate 102 and the panel array substrate 101 (including thicknesses of substrates) substantially equal to an interval Hs between the stick substrate 103 and the panel array substrate 101 (including thicknesses of substrates). For that purpose, there may be constructed a constitution in which spacers for maintaining intervals between substrates may be provided among substrates.

Further, the electric connection and the mechanical adherence between the stick substrate and the panel array substrate is completed by processing them for 15 minutes in an oven at 120° C. in a nitrogen atmosphere. Further, there may be adopted a method in which before completely adhering them, whether electric connection is insufficient is tested by a method disclosed in Japanese Unexamined Patent Publication No. JP-A-7-14880 and thereafter, the substrates are adhered.

In this embodiment, as other method of connecting the lead wiring 107 on the substrate formed with the drive circuit with the lead wiring 109 on the substrate constituting the liquid crystal panel, for example, there may be used a method in which an ultraviolet ray-curing adhesive agent mixed with conductive small particles is interposed between substrates and the connection is carried out by irradiating ultraviolet ray while applying pressure, a method of using FPC, a method of using anisotropic conductive rubber and so on.

Further, there may be constructed a constitution in which after completing the electric connection and the mechanical adherence between the stick substrate and the panel array substrate, the stick substrate is peeled off. In that case, it is preferable to form a polyimide film or the like as a protective film on the peripheral drive circuit after peeling off the stick substrate.

Embodiment 2

Figure 7:
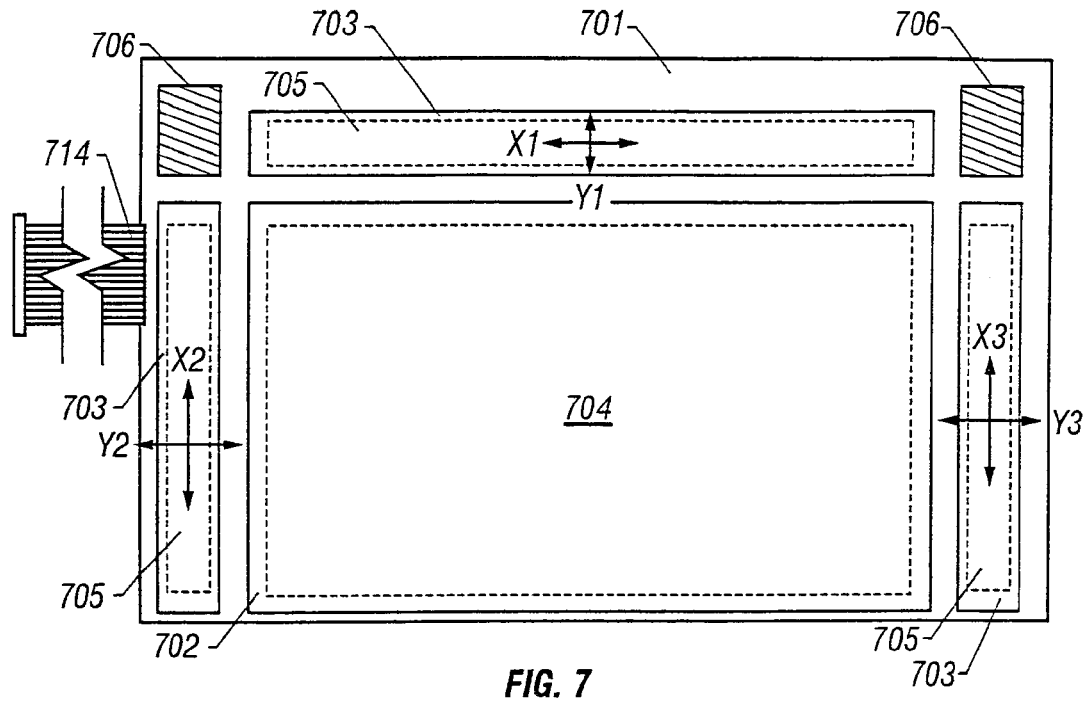
FIG. 7 is an outline view of a total showing Embodiment 2.
Figure 8:
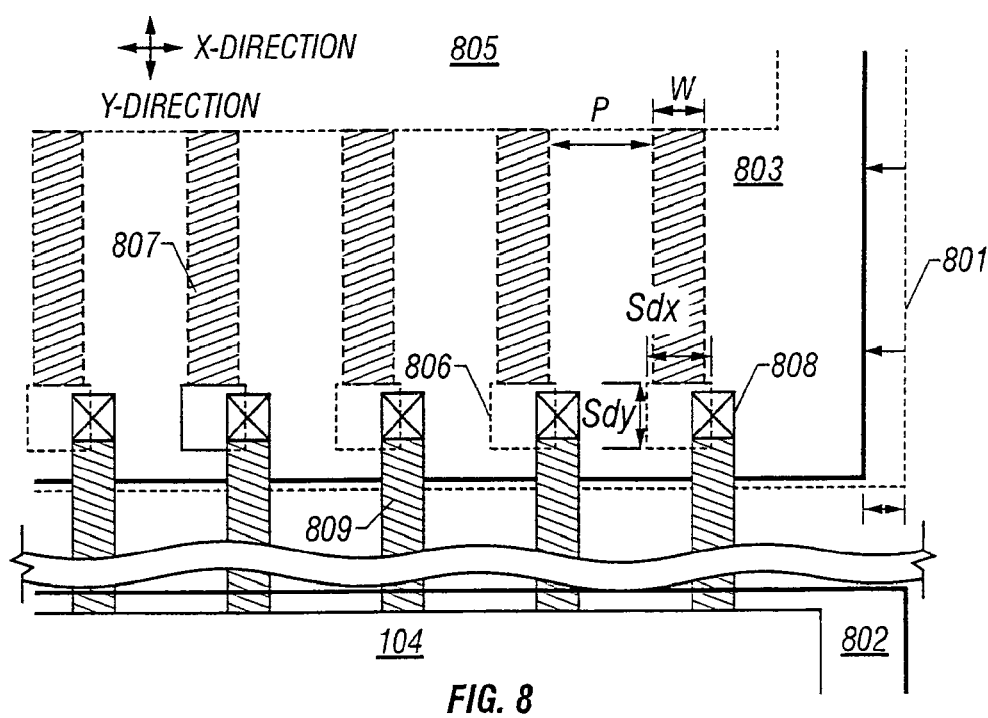
FIG. 8 is a view showing a conventional example.

FIG. 7 shows an outline view of a total of a device according to the embodiment.

In respect of a method of fabricating the device, a device can be fabricated by steps the same as those in Embodiment 1. Although Embodiment 1 is provided with a constitution in which two sheets of the stick substrates are used, in this embodiment, an example in which three sheets of the stick substrates are used is shown. Also, further integration is carried out by installing two sheets of VLSI (Very Large Scale Integrated Circuit) substrates 706 mounted with a control circuit, a memory circuit and so on. The VLSI substrate is constituted to use a silicon substrate. In respect of the VLSI substrate, one sheet, two sheets or a number of sheets of more than two thereof may be used.

Numeral 701 designates a panel array substrate, numeral 702 designates an opposed substrate, numeral 703 designates a stick substrate, numeral 704 designates a region of forming a pixel matrix, numeral 705 designates a drive circuit portion, numeral 706 designates the VLSI substrate and numeral 714 designates FPC.

In this way, further integration and alleviation in burden of the drive circuit can be carried out. Further, as an application of the embodiment, stick substrates of a larger plural number (4 sheets or more) and VLSI substrates of a larger plural number can be used.

Further, although according to the present invention, an active matrix type is used for the liquid crystal panel, other liquid crystal panels of different kinds may be used.

According to the liquid crystal electrooptical device of the present invention, occurrence of failure of connection between the stick substrate and the panel array substrate can be prevented by constituting the shape of the electrode pad (the side of the substrate having large shrinkage width) according to the present invention even when heat treatment steps different from each other are carried out and a shrinkage width or a shift in adhering is caused between the stick substrate and the panel array substrate. Further, connection failure in respect of alignment shift in pasting operation can also be prevented. That is, lead wirings of the panel array substrate and the stick substrate can firmly be connected.

Further, by constituting the shape of the electrode pad according to the present invention, a dispersion in the area overlapping the electrode pad on the panel array substrate side and the electrode pad on the stick substrate side caused mainly by shrinkage of the substrate can be prevented.

Further, by using the present invention, particularly, even in the case where the pixel matrix region of the display panel is large-sized and the stick substrate becomes long, the substrates can be connected with high accuracy. That is, by using the technology of the present invention, connection of electrode pads of a display panel having large capacity and high density can be carried out extremely easily and firmly.

In addition thereto, by the constitution of the present invention, further small size formation and light weight formation can be achieved and promotion in reliability of a liquid crystal electrooptical device can be achieved.

What is claimed is:

1. A display device comprising:
a first substrate comprising:
a drive circuit,
a plurality of first wirings electrically connected to the drive circuit, and
a plurality of first electrode pads; and
a second substrate comprising:
a pixel portion comprising a pixel electrode and a switching thin film transistor,
a plurality of second wirings electrically connected to the pixel portion, and
a plurality of second electrode pads,
wherein the first substrate is fixed on the second substrate and has a first side in a X-direction and a second side in a Y-direction, and all portions of the first substrate overlap with the second substrate,
wherein the first side is longer than the second side,
wherein each of the plurality of first wirings is electrically connected to a corresponding one of the plurality of second wirings through a conductive member,
wherein each of the plurality of first and second electrode pads is arranged in the corresponding one of the plurality of first and second wirings, respectively,
wherein each of the plurality of second electrode pads does not overlap with a nearest one of the plurality of second electrode pads in the X-direction, and
wherein an area of each of the plurality of second electrode pads is larger than an area of the corresponding one of the plurality of first electrode pads.

2. A display device according to claim 1, wherein each of the plurality of first and second electrode pads is rectangular.

3. A display device according to claim 1, wherein the first substrate is glass substrate.

4. A display device according to claim 1, wherein the second substrate is glass substrate.

5. A display device comprising:
a first substrate comprising:
a drive circuit,
a plurality of first wirings electrically connected to the drive circuit, and
a plurality of first electrode pads; and
a second substrate comprising:
a pixel portion comprising a pixel electrode and a switching thin film transistor,
a plurality of second wirings electrically connected to the pixel portion, and a plurality of second electrode pads,
wherein the first substrate is fixed on the second substrate and has a first side in a X-direction and a second side in a Y-direction, and all portions of the first substrate overlap with the second substrate,
wherein the first side is longer than the second side,
wherein each of the plurality of first wirings is electrically connected to a corresponding one of the plurality of second wirings through a conductive member,
wherein each of the plurality of first and second electrode pads is arranged in the corresponding one of the plurality of first and second wirings, respectively,
wherein each of the plurality of second electrode pads does not overlap with a nearest one of the plurality of second electrode pads in the X-direction,
wherein a center of each of the plurality of first electrode pads is shifted from a center of the corresponding one of the plurality of second electrode pads, and
wherein an area of each of the plurality of second electrode pads is larger than an area of the corresponding one of the plurality of first electrode pads.

6. A display device according to claim 5, wherein each of the plurality of first and second electrode pads is rectangular.

7. A display device according to claim 5, wherein the first substrate is glass substrate.

8. A display device according to claim 5, wherein the second substrate is glass substrate.

9. A display device comprising:
a first substrate comprising:
    a drive circuit,
    a plurality of first wirings electrically connected to the drive circuit,
    a plurality of second wirings electrically connected to the drive circuit, and
    a plurality of first electrode pads; and
a second substrate comprising:
a pixel portion comprising a pixel electrode and a switching thin film transistor,
    a plurality of third wirings electrically connected to the pixel portion,
    a plurality of second electrode pads, and
    a plurality of fourth wirings,
wherein the first substrate is fixed on the second substrate and has a first side in a X-direction and a second side in a Y-direction, and all portions of the first substrate overlap with the second substrate,
wherein the first side is longer than the second side,
wherein each of the plurality of first wirings is electrically connected to a corresponding one of the plurality of third wirings through a conductive member,
wherein each of the plurality of first and second electrode pads is arranged in the corresponding one of the plurality of first and third wirings, respectively,
wherein each of the plurality of second electrode pads does not overlap with a nearest one of the plurality of second electrode pads in the X-direction,
wherein each of the plurality of second wirings is electrically connected to a corresponding one of the plurality of fourth wirings, and
wherein an area of each of the plurality of second electrode pads is larger than an area of the corresponding one of the plurality of first electrode pads. pg,32

10. A display device according to claim 9, wherein each of the plurality of first and second electrode pads is rectangular.

11. A display device according to claim 9, wherein the first substrate is glass substrate.

12. A display device according to claim 9, wherein the second substrate is glass substrate.

13. A display device comprising:
a first substrate comprising:
    a drive circuit,
    a plurality of first wirings electrically connected to the drive circuit,
    a plurality of second wirings electrically connected to the drive circuit, and
    a plurality of first electrode pads; and
a second substrate comprising:
    a pixel portion comprising a pixel electrode and a switching thin film transistor,
    a plurality of third wirings electrically connected to the pixel portion,
    a plurality of second electrode pads, and
    a plurality of fourth wirings,
wherein the first substrate is fixed on the second substrate and has a first side in a X-direction and a second side in a Y-direction, and all portions of the first substrate overlap with the second substrate,
wherein the first side is longer than the second side,
wherein each of the plurality of first wirings is electrically connected to a corresponding one of the plurality of third wirings through a conductive member,
wherein each of the plurality of first and second electrode pads is arranged in the corresponding one of the plurality of first and third wirings, respectively,
wherein each of the plurality of second electrode pads does not overlap with a nearest one of the plurality of second electrode pads in the X-direction,
wherein a center of each of the plurality of first electrode pads is shifted from a center of the corresponding one of the plurality of second electrode pads,
wherein each of the plurality of second wirings is electrically connected to a corresponding one of the plurality of fourth wirings, and
wherein an area of each of the plurality of second electrode pads is larger than an area of the corresponding one of the plurality of first electrode pads.

14. A display device according to claim 13, wherein each of the plurality of first and second electrode pads is rectangular.

15. A display device according to claim 13, wherein the first substrate is glass substrate.

16. A display device according to claim 13, wherein the second substrate is glass substrate.

17. A display device comprising:
a first substrate comprising:
    a drive circuit,
    a plurality of first wirings electrically connected to the drive circuit, and
    a plurality of first electrode pads; and
a second substrate comprising:
    a pixel portion comprising a pixel electrode,
    a plurality of second wirings electrically connected to the pixel portion, and
    a plurality of second electrode pads,
wherein the first substrate is fixed on the second substrate and has a first side in a X-direction and a second side in a Y-direction, and all portions of the first substrate overlap with the second substrate,
wherein the first side is longer than the second side,
wherein the pixel portion comprises a plurality of pixel thin film transistors, wherein each of the plurality of pixel thin film transistors comprises an amorphous silicon film electrically connected to corresponding one of the plurality of second wirings, wherein each of the plurality of first wirings is electrically connected to a corresponding one of the plurality of second wirings through a conductive member, wherein each of the plurality of first and second electrode pads is arranged in the corresponding one of the plurality of first and second wirings, respectively, wherein each of the plurality of second electrode pads does not overlap with a nearest one of the plurality of second electrode pads in the X-direction, and wherein an area of each of the plurality of second electrode pads is larger than an area of the corresponding one of the plurality of first electrode pads.

18. A display device according to claim 17, wherein each of the plurality of first and second electrode pads is rectangular.

19. A display device according to claim 17, wherein the first substrate is glass substrate.

20. A display device according to claim 17, wherein the second substrate is glass substrate.

21. A display device comprising:
a first substrate comprising:
a drive circuit,
a plurality of first wirings electrically connected to the drive circuit, and
a plurality of first electrode pads; and
a second substrate comprising:
a pixel portion comprising a pixel electrode,
a plurality of second wirings electrically connected to the pixel portion, and
a plurality of second electrode pads,
wherein the first substrate is fixed on the second substrate and has a first side in a X-direction and a second side in a Y-direction, and all portions of the first substrate overlap with the second substrate,
wherein the first side is longer than the second side,
wherein the pixel portion comprises a plurality of pixel thin film transistors,
wherein each of the plurality of pixel thin film transistors comprises an amorphous silicon film electrically connected to corresponding one of the plurality of second wirings,
wherein each of the plurality of first wirings is electrically connected to a corresponding one of the plurality of second wirings through a conductive member,
wherein each of the plurality of first and second electrode pads is arranged in the corresponding one of the plurality of first and second wirings, respectively,
wherein each of the plurality of second electrode pads does not overlap with a nearest one of the plurality of second electrode pads in the X-direction,
wherein a center of each of the plurality of first electrode pads is shifted from a center of the corresponding one of the plurality of second electrode pads, and
wherein an area of each of the plurality of second electrode pads is larger than an area of the corresponding one of the plurality of first electrode pads.

22. A display device according to claim 21, wherein each of the plurality of first and second electrode pads is rectangular.

23. A display device according to claim 21, wherein the first substrate is glass substrate.

24. A display device according to claim 21, wherein the second substrate is glass substrate.

25. A display device comprising:
a first substrate comprising:
a drive circuit,
a plurality of first wirings electrically connected to the drive circuit, and
a plurality of first electrode pads; and
a second substrate comprising:
a pixel portion comprising a pixel electrode and a switching thin film transistor,
a plurality of second wirings electrically connected to the pixel portion, and
a plurality of second electrode pads,
wherein the first substrate is fixed on the second substrate and has a first side in a X-direction and a second side in a Y-direction, and all portions of the first substrate overlap with the second substrate,
wherein the first side is longer than the second side,
wherein each of the plurality of first wirings is electrically connected to a corresponding one of the plurality of second wirings through a conductive member,
wherein each of the plurality of first and second electrode pads is arranged in the corresponding one of the plurality of first and second wirings, respectively,
wherein each of the plurality of second electrode pads does not overlap with a nearest one of the plurality of second electrode pads in the X-direction, and
wherein an area of each of the plurality of first electrode pads is larger than an area of the corresponding one of the plurality of second electrode pads.

26. A display device according to claim 25, wherein each of the plurality of first and second electrode pads is rectangular.

27. A display device according to claim 25, wherein the first substrate is glass substrate.

28. A display device according to claim 25, wherein the second substrate is glass substrate.

29. A display device comprising:
a first substrate comprising:
a drive circuit,
a plurality of first wirings electrically connected to the drive circuit, and
a plurality of first electrode pads; and
a second substrate comprising;
a pixel portion comprising a pixel electrode and a switching thin film transistor,
a plurality of second wirings electrically connected to the pixel portion, and
a plurality of second electrode pads,
wherein the first substrate is fixed on the second substrate and has a first side in a X-direction and a second side in a Y-direction, and all portions of the first substrate overlap with the second substrate,
wherein the first side is longer than the second side,
wherein each of the plurality of first wirings is electrically connected to a corresponding one of the plurality of second wirings through a conductive member,
wherein each of the plurality of first and second electrode pads is arranged in the corresponding one of the plurality of first and second wirings, respectively,
wherein each of the plurality of second electrode pads does not overlap with a nearest one of the plurality of second electrode pads in the X-direction,
wherein a center of each of the plurality of first electrode pads is shifted from a center of the corresponding one of the plurality of second electrode pads, and
wherein an area of each of the plurality of first electrode pads is larger than an area of the corresponding one of the plurality of second electrode pads.

30. A display device according to claim 29, wherein each of the plurality of first and second electrode pads is rectangular.

31. A display device according to claim 29, wherein the first substrate is glass substrate.

32. A display device according to claim 29, wherein the second substrate is glass substrate.

33. A display device comprising:
- a first substrate comprising:
  - a drive circuit, a plurality of first wirings electrically connected to the drive circuit,
  - a plurality of second wirings electrically connected to the drive circuit, and
  - a plurality of first electrode pads; and
- a second substrate comprising:
  - a pixel portion comprising a pixel electrode and a switching thin film transistor,
  - a plurality of third wirings electrically connected to the pixel portion,
  - a plurality of second electrode pads, and
  - a plurality of fourth wirings,
- wherein the first substrate is fixed on the second substrate and has a first side in a X-direction and a second side in a Y-direction, and all portions of the first substrate overlap with the second substrate,
- wherein the first side is longer than the second side,
- wherein each of the plurality of first wirings is electrically connected to a corresponding one of the plurality of third wirings through a conductive member,
- wherein each of the plurality of first and second electrode pads is arranged in the corresponding one of the plurality of first and third wirings, respectively,
- wherein each of the plurality of second electrode pads does not overlap with a nearest one of the plurality of second electrode pads in the X-direction,
- wherein each of the plurality of second wirings is electrically connected to a corresponding one of the plurality of fourth wirings, and
- wherein an area of each of the plurality of first electrode pads is larger than an area of the corresponding one of the plurality of second electrode pads.

34. A display device according to claim 33, wherein each of the plurality of first and second electrode pads is rectangular.

35. A display device according to claim 33, wherein the first substrate is glass substrate.

36. A display device according to claim 33, wherein the second substrate is glass substrate.

37. A display device comprising:
- a first substrate comprising:
  - a drive circuit,
  - a plurality of first wirings electrically connected to the drive circuit,
  - a plurality of second wirings electrically connected to the drive circuit, and
  - a plurality of first electrode pads, and
- a second substrate comprising:
  - a pixel portion comprising a pixel electrode and a switching thin film transistor,
  - a plurality of third wirings electrically connected to the pixel portion,
  - a plurality of second electrode pads, and
  - a plurality of fourth wirings,
- wherein the first substrate is fixed on the second substrate and has a first side in a X-direction and a second side in a Y-direction, and all portions of the first substrate overlap with the second substrate,
- wherein the first side is longer than the second side,
- wherein each of the plurality of first wirings is electrically connected to a corresponding one of the plurality of third wirings through a conductive member,
- wherein each of the plurality of first and second electrode pads is arranged in the corresponding one of the plurality of first and third wirings, respectively,
- wherein each of the plurality of second electrode pads does not overlap with a nearest one of the plurality of second electrode pads in the X-direction,
- wherein a center of each of the plurality of first electrode pads is shifted from a center of the corresponding one of the plurality of second electrode pads,
- wherein each of the plurality of second wirings is electrically connected to a corresponding one of the plurality of fourth wirings, and
- wherein an area of each of the plurality of first electrode pads is larger than an area of the corresponding one of the plurality of second electrode pads.

38. A display device according to claim 37, wherein each of the plurality of first and second electrode pads is rectangular.

39. A display device according to claim 37, wherein the first substrate is glass substrate.

40. A display device according to claim 37, wherein the second substrate is glass substrate.

41. A display device comprising:
- a first substrate comprising:
  - a drive circuit,
  - a plurality of first wirings electrically connected to the drive circuit, and
  - a plurality of first electrode pads; and
- a second substrate comprising:
  - a pixel portion comprising a pixel electrode,
  - a plurality of second wirings electrically connected to the pixel portion, and
  - a plurality of second electrode pads,
- wherein the first substrate is fixed on the second substrate and has a first side in a X-direction and a second side in a Y-direction, and all portions of the first substrate overlap with the second substrate,
- wherein the first side is longer than the second side,
- wherein the pixel portion comprises a plurality of pixel thin film transistors,
- wherein each of the plurality of pixel thin film transistors comprises an amorphous silicon film electrically connected to corresponding one of the plurality of second wirings,
- wherein each of the plurality of first wirings is electrically connected to a corresponding one of the plurality of second wirings through a conductive member,
- wherein each of the plurality of first and second electrode pads is arranged in the corresponding one of the plurality of first and second wirings, respectively
- wherein each of the plurality of second electrode pads does not overlap with a nearest one of the plurality of second electrode pads in the X-direction, and
- wherein an area of each of the plurality of first electrode pads is larger than an area of the corresponding one of the plurality of second electrode pads.

42. A display device according to claim 41, wherein each of the plurality of first and second electrode pads is rectangular.

43. A display device according to claim 41, wherein the first substrate is glass substrate.

44. A display device according to claim 41, wherein the second substrate is glass substrate.

45. A display device comprising:
- a first substrate comprising:
  - a drive circuit,
  - a plurality of first wirings electrically connected to the drive circuit, and
  - a plurality of first electrode pads; and a second substrate comprising:
a pixel portion comprising a pixel electrode,
a plurality of second wirings electrically connected to the pixel portion, and
a plurality of second electrode pads,
wherein the first substrate is fixed on the second substrate and has a first side in a X-direction and a second side in a Y-direction, and all portions of the first substrate overlap with the second substrate,
wherein the first side is longer than the second side,
wherein the pixel portion comprises a plurality of pixel thin film transistors,
wherein each of the plurality of pixel thin film transistors comprises an amorphous silicon film electrically connected to corresponding one of the plurality of second wirings,
wherein each of the plurality of first wirings is electrically connected to a corresponding one of the plurality of second wirings through a conductive member,
wherein each of the plurality of first and second electrode pads is arranged in the corresponding one of the plurality of first and second wirings, respectively,
wherein each of the plurality of second electrode pads does not overlap with a nearest one of the plurality of second electrode pads in the X-direction,
wherein a center of each of the plurality of first electrode pads is shifted from a center of the corresponding one of the plurality of second electrode pads, and
wherein an area of each of the plurality of first electrode pads is larger than an area of the corresponding one of the plurality of second electrode pads.

46. A display device according to claim 45, wherein each of the plurality of first and second electrode pads is rectangular.

47. A display device according to claim 45, wherein the first substrate is glass substrate.

48. A display device according to claim 45, wherein the second substrate is glass substrate.

* * * * *